United States Patent
Song et al.

(10) Patent No.: US 6,442,189 B1
(45) Date of Patent: Aug. 27, 2002

(54) BINARY CODE PHASE OFFSET CALCULATION METHOD AND A BINARY CODE PHASE SYNCHRONIZATION METHOD BY USING THE PHASE OFFSET

(75) Inventors: Young Joon Song, Seoul; Young Yearl Han; Ok Hyun Jeong, both of Kyungki-do, all of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/113,288

(22) Filed: Jul. 10, 1998

(30) Foreign Application Priority Data

Jan. 14, 1998 (KR) .................................. 98-884
Jun. 19, 1998 (KR) .............................. 98-23153

(51) Int. Cl.[7] ............................................. H04L 27/30
(52) U.S. Cl. ..................... 375/139; 375/150; 375/343
(58) Field of Search ................................ 375/134, 137, 375/139, 140, 142, 145, 149, 150, 152, 343, 367; 370/515

(56) References Cited

U.S. PATENT DOCUMENTS

| 5,533,038 A | * | 7/1996 | Andrea .......................... 714/821 |
| 5,867,525 A | * | 2/1999 | Giallorenzi et al. ......... 375/145 |
| 5,953,367 A | * | 9/1999 | Zhodzicshsky et al. ..... 375/147 |

OTHER PUBLICATIONS

Han, et al, "Phase Offset of Binary Code and its Application to the CDMA Mobile Communication," Proceedings of ITC–CSCC 1997, Okinawa, Japan, pp. 873–876.

* cited by examiner

Primary Examiner—Young T. Tse
(74) Attorney, Agent, or Firm—Birch, Stewart, Kolasch & Birch, LLP

(57) ABSTRACT

The present invention is to provide a phase offset calculation method of binary code being used in a mobile communication system, a binary code error detection method for detecting errors occurred in the received binary code by using the phase offset of the binary code and a synchronization method of binary code greatly reducing an acquisition time by using the error detection. The present invention to calculate the phase offset of binary code includes a step of receiving the binary code $T^r(C)$ shifting with a period n, a step of calculating a binary code weight accumulation value by selecting the accumulator function weight value 1 of the binary code and then by applying the weight value to said binary code, a step of obtaining a phase shift value by shifting the phase of the binary code weight accumulator value, and a step of calculating the phase offset of the binary code by performing an operation of modulo n on said binary code weight accumulator value. Furthermore, an error detection method of binary code for detecting errors in a received binary code by using the phase offset calculation method of binary code and the synchronization method of binary code performing in high speed a synchronization acquisition of the phase synchronization signal by using the phase offset calculation method of binary code and the error detection method are provided.

6 Claims, 19 Drawing Sheets

FIG.7A n=7,k=1

| $T^i(C)$ | $(C_{n-i}, C_{n-i+1}, \ldots, C_{n-i-1})$ | $A_0^1(T^i(C))$ | $6 A_0^1(T^i(C))$ (mod7) |
|---|---|---|---|
| C | (1,1,1,1,1,1,0) | 21 | 0 |
| $T^1(C)$ | (0,1,1,1,1,1,1) | 27 | 1 |
| $T^2(C)$ | (1,0,1,1,1,1,1) | 26 | 2 |
| $T^3(C)$ | (1,1,0,1,1,1,1) | 25 | 3 |
| $T^4(C)$ | (1,1,1,0,1,1,1) | 24 | 4 |
| $T^5(C)$ | (1,1,1,1,0,1,1) | 23 | 5 |
| $T^6(C)$ | (1,1,1,1,1,0,1) | 22 | 6 |

FIG.7B n=7,k=2

| $T^i(C)$ | $(C_{n-i}, C_{n-i+1}, \ldots, C_{n-i-1})$ | $A_0^1(T^i(C))$ | $3 \cdot A_0^1(T^i(C))$ (mod7) |
|---|---|---|---|
| C | (0,1,1,1,1,0,1) | 21 | 0 |
| $T^1(C)$ | (1,0,1,1,1,1,0) | 19 | 1 |
| $T^2(C)$ | (0,1,0,1,1,1,1) | 24 | 2 |
| $T^3(C)$ | (1,0,1,0,1,1,1) | 22 | 3 |
| $T^4(C)$ | (1,1,0,1,0,1,1) | 20 | 4 |
| $T^5(C)$ | (1,1,1,0,1,0,1) | 18 | 5 |
| $T^6(C)$ | (1,1,1,1,0,1,0) | 16 | 6 |

FIG.7C n=7,k=3

| $T^i(C)$ | $(C_{n-i}, C_{n-i+1}, \ldots, C_{n-i-1})$ | $A_0^1(T^i(C))$ | $2 \cdot A_0^1(T^i(C))$ (mod7) |
|---|---|---|---|
| C | (1,1,0,1,0,0,1) | 14 | 0 |
| $T^1(C)$ | (1,1,1,0,1,0,0) | 11 | 1 |
| $T^2(C)$ | (0,1,1,1,0,1,0) | 15 | 2 |
| $T^3(C)$ | (0,0,1,1,1,0,1) | 19 | 3 |
| $T^4(C)$ | (1,0,0,1,1,1,0) | 16 | 4 |
| $T^5(C)$ | (0,1,0,0,1,1,1) | 20 | 5 |
| $T^6(C)$ | (1,0,1,0,0,1,1) | 17 | 6 |

FIG.7D n=7,k=4

| $T^i(C)$ | $(C_{n-i}, C_{n-i+1}, \ldots, C_{n-i-1})$ | $A_0^1(T^i(C))$ | $5 \cdot A_0^1(T^i(C))$ (mod7) |
|---|---|---|---|
| C | (1,1,0,1,0,0,0) | 7 | 0 |
| $T^1(C)$ | (0,1,1,0,1,0,0) | 10 | 1 |
| $T^2(C)$ | (0,0,1,1,0,1,0) | 13 | 2 |
| $T^3(C)$ | (0,0,0,1,1,0,1) | 16 | 3 |
| $T^4(C)$ | (1,0,0,0,1,1,0) | 12 | 4 |
| $T^5(C)$ | (0,1,0,0,0,1,1) | 15 | 5 |
| $T^6(C)$ | (1,0,1,0,0,0,1) | 11 | 6 |

FIG.7E n=7,k=5

| $T^i(C)$ | $(C_{n-i}, C_{n-i+1}, \ldots, C_{n-i-1})$ | $A_0^1(T^i(C))$ | $4 \cdot A_0^1(T^i(C))$ (mod7) |
|---|---|---|---|
| C | (0,1,0,0,1,0,0) | 7 | 0 |
| $T^1(C)$ | (0,0,1,0,0,1,0) | 9 | 1 |
| $T^2(C)$ | (0,0,0,1,0,0,1) | 11 | 2 |
| $T^3(C)$ | (1,0,0,0,1,0,0) | 6 | 3 |
| $T^4(C)$ | (0,1,0,0,0,1,0) | 8 | 4 |
| $T^5(C)$ | (0,0,1,0,0,0,1) | 10 | 5 |
| $T^6(C)$ | (1,0,0,1,0,0,0) | 5 | 6 |

FIG.7F n=7,k=6

| $T^i(C)$ | $(C_{n-i}, C_{n-i+1}, \ldots, C_{n-i-1})$ | $A_0^1(T^i(C))$ | $1 \cdot A_0^1(T^i(C))$ (mod7) |
|---|---|---|---|
| C | (0,0,0,0,0,0,1) | 7 | 0 |
| $T^1(C)$ | (1,0,0,0,0,0,0) | 1 | 1 |
| $T^2(C)$ | (0,1,0,0,0,0,0) | 2 | 2 |
| $T^3(C)$ | (0,0,1,0,0,0,0) | 3 | 3 |
| $T^4(C)$ | (0,0,0,1,0,0,0) | 4 | 4 |
| $T^5(C)$ | (0,0,0,0,1,0,0) | 5 | 5 |
| $T^6(C)$ | (0,0,0,0,0,1,0) | 6 | 6 |

FIG.8A n=7, k=1

| $T^i(C)$ | $(C_{n-i}, C_{n-i+1}, \ldots, C_{n-i-1})$ | $A_1^1(T^i(C))$ | $3 \cdot A_1^1(T^i(C))$ (mod 7) |
|---|---|---|---|
| C | (1,1,1,1,1,1,−1) | 14 | 0 |
| $T^1(C)$ | (−1,1,1,1,1,1,1) | 26 | 1 |
| $T^2(C)$ | (1,−1,1,1,1,1,1) | 24 | 2 |
| $T^3(C)$ | (1,1,−1,1,1,1,1) | 22 | 3 |
| $T^4(C)$ | (1,1,1,−1,1,1,1) | 20 | 4 |
| $T^5(C)$ | (1,1,1,1,−1,1,1) | 18 | 5 |
| $T^6(C)$ | (1,1,1,1,1,−1,1) | 16 | 6 |

FIG.8B n=7, k=2

| $T^i(C)$ | $(C_{n-i}, C_{n-i+1}, \ldots, C_{n-i-1})$ | $A_1^1(T^i(C))$ | $5 \cdot A_1^1(T^i(C))$ (mod 7) |
|---|---|---|---|
| C | (−1,1,1,1,1,−1,1) | 14 | 0 |
| $T^1(C)$ | (1,−1,1,1,1,1,−1) | 10 | 1 |
| $T^2(C)$ | (−1,1,−1,1,1,1,1) | 20 | 2 |
| $T^3(C)$ | (1,−1,1,−1,1,1,1) | 16 | 3 |
| $T^4(C)$ | (1,1,−1,1,−1,1,1) | 12 | 4 |
| $T^5(C)$ | (1,1,1,−1,1,−1,1) | 8 | 5 |
| $T^6(C)$ | (1,1,1,1,−1,1,−1) | 4 | 6 |

FIG.8C n=7,k=3

| $T^i(C)$ | $(C_{n-i}, C_{n-i+1}, \ldots, C_{n-i-1})$ | $A_1^1(T^i(C))$ | $1 \cdot A_1^1(T^i(C))$ (mod7) |
|---|---|---|---|
| C | (1,1,−1,1,−1,−1,1) | 0 | 0 |
| $T^1(C)$ | (1,1,1,−1,1,−1,−1) | −6 | 1 |
| $T^2(C)$ | (−1,1,1,1,−1,1,−1) | 2 | 2 |
| $T^3(C)$ | (−1,−1,1,1,1,−1,1) | 10 | 3 |
| $T^4(C)$ | (1,−1,−1,1,1,1,−1) | 4 | 4 |
| $T^5(C)$ | (−1,1,−1,−1,1,1,1) | 12 | 5 |
| $T^6(C)$ | (1,−1,1,−1,−1,1,1) | 6 | 6 |

FIG.8D n=7,k=4

| $T^i(C)$ | $(C_{n-i}, C_{n-i+1}, \ldots, C_{n-i-1})$ | $A_1^1(T^i(C))$ | $6 \cdot A_1^1(T^i(C))$ (mod7) |
|---|---|---|---|
| C | (1,1,−1,1,−1,−1,−1) | −14 | 0 |
| $T^1(C)$ | (−1,1,1,−1,1,−1,−1) | −8 | 1 |
| $T^2(C)$ | (−1,−1,1,1,−1,1,−1) | −2 | 2 |
| $T^3(C)$ | (−1,−1,−1,1,1,−1,1) | 4 | 3 |
| $T^4(C)$ | (1,−1,−1,−1,1,1,−1) | −4 | 4 |
| $T^5(C)$ | (−1,1,−1,−1,−1,1,1) | 2 | 5 |
| $T^6(C)$ | (1,−1,1,−1,−1,−1,1) | −6 | 6 |

FIG.8E n=7,k=5

| $T^i(C)$ | $(C_{n-i}, C_{n-i+1}, \ldots, C_{n-i-1})$ | $A_1^1(T^i(C))$ | $2 \cdot A_1^1(T^i(C))$ (mod7) |
|---|---|---|---|
| C | (-1,1,-1,-1,1,-1,-1) | -14 | 0 |
| $T^1(C)$ | (-1,-1,1,-1,-1,1,-1) | -10 | 1 |
| $T^2(C)$ | (-1,-1,-1,1,-1,-1,1) | -6 | 2 |
| $T^3(C)$ | (1,-1,-1,-1,1,-1,-1) | -16 | 3 |
| $T^4(C)$ | (-1,1,-1,-1,-1,1,-1) | -12 | 4 |
| $T^5(C)$ | (-1,-1,1,-1,-1,-1,1) | -8 | 5 |
| $T^6(C)$ | (1,-1,-1,1,-1,-1,-1) | -18 | 6 |

FIG.8F n=7,k=6

| $T^i(C)$ | $(C_{n-i}, C_{n-i+1}, \ldots, C_{n-i-1})$ | $A_1^1(T^i(C))$ | $4 \cdot A_1^1(T^i(C))$ (mod7) |
|---|---|---|---|
| C | (-1,-1,-1,-1,-1,-1,1) | -14 | 0 |
| $T^1(C)$ | (1,-1,-1,-1,-1,-1,-1) | -26 | 1 |
| $T^2(C)$ | (-1,1,-1,-1,-1,-1,-1) | -24 | 2 |
| $T^3(C)$ | (-1,-1,1,-1,-1,-1,-1) | -22 | 3 |
| $T^4(C)$ | (-1,-1,-1,1,-1,-1,-1) | -20 | 4 |
| $T^5(C)$ | (-1,-1,-1,-1,1,-1,-1) | -18 | 5 |
| $T^6(C)$ | (-1,-1,-1,-1,-1,1,-1) | -16 | 6 |

FIG.9

| $T^i(C)$ | $a*A_0^0(T^i(C))$ (mod 5) | $a*A_0^1(T^i(C))$ (mod 5) | $a*A_0^2(T^i(C))$ (mod 5) | $a*A_0^3(T^i(C))$ (mod 5) | $a*A_0^4(T^i(C))$ (mod 5) |
|---|---|---|---|---|---|
| C | 1 | 2 | 3 | 4 | 0 |
| T(C) | 2 | 3 | 4 | 0 | 1 |
| $T^2(C)$ | 3 | 4 | 0 | 1 | 2 |
| $T^3(C)$ | 4 | 0 | 1 | 2 | 3 |
| $T^4(C)$ | 0 | 1 | 2 | 3 | 4 |

BINARY CODE PHASE OFFSET CALCULATION METHOD AND A BINARY CODE PHASE SYNCHRONIZATION METHOD BY USING THE PHASE OFFSET

BACKGROUND OF THE INVENTION

1. Field of the Invention

The present invention relates to a binary code phase offset calculation method of a mobile communication system.

2. Discussion of the Related Art

Among the codes with q elements which are used for transmitting information in a CDMA or CTDMA of a digital communication system, a binary code whose q is 2 is generally used. The analog signals such as voice signals or image signals are converted into a binary code by an analog to digital converter. This binary code is modulated according to a frequency translation to be transmitted by a radio or wire communication system. The receiver recovers the analog signal from the modulated binary code. Thus, the binary code is not only transmitted as information itself but also used as a spread spectrum code in the code division multiple access system or the code time division multiple access system of the mobile communication.

To increase the capacity of cellular mobile communication, the digital cellular mobile communication using the global system for mobile (GSM) communication has been commercialized in European countries and the TDMA and CDMA systems have commercially been used in the USA. The T1A/ELA/IS95CDMA system developed by Qualcomm of the USA is used as the standard communication system of Korea.

For the CDMA systems mentioned above, a code having a special autocorrelation function is used as a spread code and it is also used for synchronization of a receiver and cryptography, etc.

In the CDMA system, each base station is assigned to its own phase offset and is identified by the phase offset. Therefore, the soft handoff which matches the phase offsets between the pseudo noise (PN) signals each of which belonging to each base station is possible and a mobile station belonging to one cell uses the phase difference of identical signals received from other base stations in order to identify the base stations from which the signals are transmitted.

According to a conventional CDMA system, each of the received PN spread codes is in one to one correspondence with a reference PN spread code having a length of $2^{15}$ bits. Since the method for acquiring the phase offset information of the PN spread code to identify each base station is used in the conventional CDMA system, the amount of calculation for calculating the phase offset is very large and the hardware complexity for the system is also high. It is practically impossible for a terminal or a mobile station to process the large amount of calculations for the phase offset information of the PN spread code. Therefore, the phase offset of the PN spread code is calculated at each base station and then transmitted to each terminal by a modulated signal.

In the CDMA system of the International Telecommunication Standardization Sector (ITSS), the Barker code with a length of 13 is used as its spread code, and many subscribers using the same frequency bandwidth in one base station is assigned to the identical Barker spread code but each code assigned to each subscriber has a different phase offset or time offset from one another. In other words, the information of the phase offset information is the same as the channel number assigned to each subscriber and therefore each subscriber is identified according the phase offset information.

However, the CDMA system of the ITSS, as the other conventional CDMA system described beforehand, uses a modulation method by which the offset information is modulated with a transmission signal in a base station and the modulated signal is transmitted from the base station to a terminal.

A conventional phase synchronization method of a binary code is described in a paper of Acquisition Time Performance of PN Spread Spectrum System, by C.C. Chen published in IEEE Transaction on Communication Vol COM-25 NO.8 PP778–784, August 1997.

In the phase synchronization method of binary code disclosed in the paper, as shown in FIG. 1, a received pseudo noise (PN) code is multiplied with a local PN code provided from the stored local PN code updater 4 in the multiplier 1. The output of the multiplier 1 is integrated by the integrator 2 for the dwell time τd. The output of the integrator 2 is the correlation value. This correlation value is compared with a predetermined threshold value in the threshold comparator 3. When the correlation value is not larger than the threshold value, the comparator 3 transmits a control signal to the local PN code updater 4 to update the local PN code so that the local PN code is generated in advance or delayed by one chip interval or a half chip interval. The output of the updated local PN code is multiplied by the received PN code in the multiplier 1. By performing repeatedly this procedure until the correlation value generated from the integrator 2 is larger than the threshold value, the acquisition of PN code, that is a coarse synchronization, is achieved. If the PN code acquisition is achieved and therefrom the correlation value obtained from the integrator 2 is larger than the threshold value, the PN code tracking, that is a fine synchronization, is performed.

When the total number q of the cell to be searched during one period satisfies q>>1, the average synchronization time of the PN code synchronization method is $$T_{acq} = \frac{(2 - P_D)(1 + KP_{FA})}{2P_D}(q\tau_D), \qquad \text{[equation 1]}$$

where q equals the length of the PN code or a multiple of the length. For example, q equals the length of the PN code when the local PN code is updated by one chip interval and q is twice the length of the PN code when the local PN code is updated by a half chip interval. $P_D$ is a signal detection probability and $P_{FA}$ is a false alarm probability. K is an average penalty according to the false alarm.

The average time from the time at which the system enters the tracking loop by the false alarm and to the time at which the system escapes from the loop is $K\tau_D$.

In the mobile communication system used in a conventional CDMA system described in detail above, the mobile station (terminal) cannot acquire the phase offset information by itself if the phase offset information concerned with its neighbor cells is not provided by the base station. Therefore, the mobile station cannot simultaneously demodulate both the signal received from the base station to which the mobile station belongs and the signal received from other base stations. Furthermore, when a mobile station is going to move out of the area covered by its present base station and enter another area covered by another base station having a different phase offset, the mobile station cannot match the phase offset of the present base station with the phase offset of the spread code of the new base station. Therefore, the mobile station cannot have a handoff function for itself and the traffic of the base station is increased. Even in the CDMA system, since a subscriber cannot acquire the phase offset being used by the other subscriber without the help of the base station and cannot even pick up a phase offset or a channel which is not occupied by other subscribers, the conventional method has a problem of an increased traffic in the base station.

Since the conventional binary code synchronization method performs repeatedly the procedure that updates the local PN code by increasing or decreasing the code by one chip or a half chip interval until the correlation value is larger than the threshold value, the conventional method has a problem of a long acquisition time.

SUMMARY OF THE INVENTION

Accordingly, the present invention is directed to solve the problems of the conventional techniques described above.

The present invention provides a binary code phase offset calculation method that the binary code phase offset is easily calculated and therefore the calculation is done in the subscriber terminal.

The present invention also provides a synchronization method of the binary code that greatly reduces the acquisition time by using the binary code phase offset.

Furthermore, the present invention provides an error detection method of the binary code that determines whether or not an error is in a received binary code by using the binary code phase offset.

To achieve the present invention, as embodied and broadly described, the binary code phase offset calculation method according to the present invention includes the first step of receiving a cyclic binary code $T^i(C)$ having a period n, the second step of setting an accumulator function weight value of the binary code and then calculating the binary code weighted accumulator value by applying said weight value to said binary code, the third step of performing the phase shift of the binary code weighted accumulator value, and the fourth step of calculating the binary code phase offset by performing a modulo n on the result of the third step of performing.

Another embodiment of the binary code-phase offset calculation method according to the present invention includes the step of receiving two identical binary codes $T^X(C)$ and $T^Y(C)$ having the same period n and different phase offsets X and Y, respectively, the step of setting two binary code accumulator function weights s and 1 and calculating two binary code weighted accumulator values $A^s(T^X(C))$ and $A^l(T^Y(C))$ according to the two weights s and l, the step of setting an arithmetic inverse a* corresponding to $a^*(n-2k)=1(\bmod n)$ if said two binary codes are {-1, 1} and setting an arithmetic inverse a* corresponding to $a^*(n-k)=1(\bmod n)$ if said two binary codes are {-1, 1}, the step of calculating the difference $a^*A^s(T^X(C))-a^*A^l(T^Y(C))$ after performing the phase shift on the two weighted accumulator values $A^s(T^X(C))$ and $A^l(T^Y(C))$, and the step of generating the two binary code phase offset X-Y by adding said difference and the weight difference l-s and then by performing a modulo n operation on the result of the step of adding.

The binary code error detection method according to the present invention includes the step of receiving a binary code $T^i(\hat{C})$ with a period n where n and i are integers, T is a cyclic operator and $\hat{C}$ is a binary code, and then calculating a binary code accumulator value, the step of performing the phase shift of said accumulator value, and the step of deciding whether or not a number of specific elements of the received binary code is k after a modulo n operation is performed on the result of said step of performing and whether or not the value of the operation is 1 is determined.

A binary code synchronization method using a phase offset according to the present invention includes the step of calculating a phase offset by calculating an accumulator weighted value $A^l(T^{i+j}(\hat{C}))$ over the one period in which the weight of the received cyclic binary code $T^{i+j}(\hat{C})$ with a period n is l, where i, j and l are integers, $\hat{C}$ is a received binary code and T is a cyclic operator, an accumulator weighted value $A^l(T^i(\hat{C}))$ of the cyclic binary code $T^i(C)$ with a period n of a local PN code generator where C is a binary code of the local PN code generator without having any error, respectively, by calculating the difference between the two accumulator weighted values, by calculating the phase shift value after performing a phase shift on the difference, and by performing a modulo n on the phase shift value, the step of calculating an added value $$\hat{C}(1) = \sum_{i=0}^{n-1} \hat{C}_i$$

over the one period of the received binary code $T^{i+j}(\hat{C})$, performing the phase shift on the added value, performing a modulo n on the result of said step of performing and determining whether or not the result of said performing a modulo n operation is 1, the step of repeatedly performing both the step of calculating the received binary code phase offset and the step of checking the said modulo n operation value until the modulo n operation value becomes 1 if the modulo n operation value is not 1, the step of performing a cyclic shift on the phase of the local PN binary code by the calculated phase offset if the modulo n operation value is 1 and then switching to a tracking mode which is a fine synchronization, and the step of repeatedly performing all said steps in sequence from the first step until the synchronization is completed in a predetermined time if the synchronization is not achieved in the predetermined time after switching to the tracking mode.

The terminologies to be used in the present invention are defined as follows:

The binary code C has a period n. k is a number of the elements 1 or -1 included in the binary code. When the binary code consists of two elements 0 and 1, the binary code satisfies the condition that n and k are prime to each other, i.e. gcd(n,k)=1. When the binary code consists of two elements -1 and 1, the binary code satisfies the condition that n and 2k are prime to each other, i.e. gcd(n,2k)=1.

The binary code c which is n-tuple and the right cyclic operator T are defined as $$C = (C_0, C_1, \cdots C_{n-2}, C_{n-1}) \qquad \text{[equation 2]}$$

$$T(C) = (C_{n-1}, C_0, C_1, \cdots C_{n-2})$$

$$\vdots$$

$$T^i(C) = (C_{n-i}, C_{n-i+1}, \cdots C_{n-i-2}, C_{n-i-1})$$

$$\vdots$$

$$T^{n-1}(C) = (C_1, C_2, \cdots C_{n-i}, C_0), \text{ and}$$

if $i = j \pmod{n}$, then $$T^i(C) = T^j(C) = (C_{n-i}, C_{n-i+1}, \cdots C_{n-i-2}, C_{n-i-1}),$$

where $i$ and $j$ are integers and $T^0(C) = C$.

The code $T^j(C)$ is defined as a polynomial $$C(x) = C_{n-j} + C_{n-j+1}x \cdots + C_{n-j-1}x^{n-1} \quad [\text{equation 3}]$$

The accumulator function whose weight value is 1 is defined as $$A^l(T^j(C)) = d/dx^l C(x)|_{x=1} = lC_{n-j} + (l+1)C_{n-j+1} \cdots + (l+n-1)C_{n-j-1}, \quad [\text{equation 4}]$$

where 1 is an arbitrary integer. If two numbers l and s satisfy the condition that l=s(mod n), then $A^l(T^j(C)) = A^s(T^j(C))$ (mod n).

If the element of the binary code C of n tuple is $\{-1, 1\}$, the accumulator function $A^l(T^j(C))$ is represented as $A^l_{-1}(C)$. If the element of the binary code C is $\{0, 1\}$, the accumulator function $A^l(T^j(C))$ is represented as $A^l_0(C)$. It the element of the binary code C may be one of the two cases the subscripted index is omitted.

If the binary code C satisfies the condition that $A^l(T^j(C)) = 0 \pmod n$, it is defined as a reference code of the accumulator function with a weight l or a zero offset code.

If the binary code C consists of the element $\{0, 1\}$, a* is selected as an arithmetic inverse of n−k of the a*(n−k)=1 (modulo n).

If the binary code C consists of the element $\{-1, 1\}$, a* is selected as an arithmetic inverse of n−2k of the a*(n−2k)=1(modulo n).

If the weight l is 1, equation 4 becomes as $$A^l(T^j(C)) = \frac{d}{dx}x^l C(x)|_{x=1}$$
$$= \frac{d}{dt}(xC_{n-j} + x^2 C_{n-j+1} + \cdots + x^{n-1}C_{n-j-2} + x^n C_{n-j-1})|_{x=1}$$
$$= C_{n-j-1} + (C_{n-j-1} + C_{n-j-2}) +$$
$$(C_{n-j-1} + C_{n-j-2} + \cdots + C_{n-j+1}) +$$
$$(C_{n-j-1} + C_{n-j-2} + \cdots + C_{n-j+1} + C_{n-j})$$

The following equation is derived from the equations 4 and 5.

$$A^l(T^j(C)) = A^l(T^j(C)) + (l-1)C(1) \quad [\text{equation 6}]$$

When a number of the 0, 1 or −1 elements included in each one of the binary codes C and $\hat{C}$ is k and $\hat{k}$, respectively, and the element included in the binary code C satisfies the condition that (2k,n)=1 when $C_i \in \{-1, 1\}$ and satisfies the condition that (k, n)=1 when $C_i \in \{0, 1\}$, k≠$\hat{k}$, and $\xi$ and n are prime to each other, the following equation is obtained.

$$a*[A^i(T^\xi(\hat{C})) - A^i(\hat{C})] \neq \epsilon(\text{mod } n) \; a*\hat{C}(1) \neq 1(\text{mod } n), \quad [\text{equation 7}]$$

where n is an integer and $$\hat{C} = \sum_{i=0}^{n-1} \hat{C}_i$$

a* is an arithmetic inverse of a modulo n.
The reason is as follows.
Each one of the binary codes C and $\hat{C}$ is defined as $$C = (C_0, C_0, \ldots, C_{n-1})$$
$$\hat{C} = (\hat{C}_0, \hat{C}_1, \ldots, \hat{C}_{n-1})$$

When k and $\hat{k}$ represent a number of the elements 0, 1 or −1 included in C and $\hat{C}$, respectively, k≠$\hat{k}$. Therefore, it is possible to write that $\hat{k}$=k+k'. Since 1<k and $\hat{k}$<n−1, k'≠0 and |k'|≦n−2.

When the element included in the binary code C is $C_i \in \{-1, 1\}$, the condition (2k, n)=1 is satisfied and n is an odd number.

Since a* is an arithmetic inverse of −2k modulo n, −2ka*=1(mod l).

This means (−2k a*,n)=1 and therefore (a*,n)=1 according to (2k,n)=1.

Therefore, the phase offset between the binary code C and the identical binary code $T^{86}(\hat{C})$ on which the cyclic phase shift is done by $\xi$ times, is $$a*[A_1^i(T^\xi(\hat{C})) - A_1^i(\hat{C})] = a*\xi\hat{C} \quad [\text{equation 8}]$$
$$= a*(-2\hat{k}\xi) \; (\text{mod } n)$$
$$= a*(-2\xi(k+k')) \; (\text{mod } n)$$
$$= (\xi + bk') \; (\text{mod } n),$$

where $b = -2\xi a * (\text{mod } n)$.

Since the necessary condition for $$\xi a*\hat{C} \neq \xi(\text{mod } n)$$

is that $a*\hat{C}(1) \equiv 1[\text{mod } n/(\xi, n) \equiv 1(\text{mod } n)$, the equation $a*\hat{C}(1) \neq 1(\text{mod } n)$ is established from the equation $\xi a*\hat{C}(1) \neq \xi(\text{mod } n)$. As the result, (a*,n)=1 and k' is an integer satisfying the condition that k'≠0 and |k'|≦n−2.

Therefore, if $(\xi, n)=1$, then (b, n)=1, b k'≠0(mod n), $a*\xi\hat{C}(1)=(\xi b k')(\text{mod } n)$, and $a*\hat{C}(1) \neq 1(\text{mod } n)$.

As the result, equation 8 is established for the case that the element included in the binary code C is $C \in \{-1, 1\}$.

According to the same procedure, equation 8 is established in the case that the element included in the binary code C is $C \in \{0, 1\}$.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 7a to 7f show the phase offset calculation values of binary code according to the first embodiment of the present invention.

FIGS. 8a to 8f show the phase offset calculation values of binary code according to the second embodiment of the present invention.

FIG. 9 shows the accumulation function values according to the weight value variations and the shift of the binary codes in the third embodiment of the present invention.

DETAILED DESCRIPTION OF THE PREFERRED EMBODIMENT

Reference will now be made in detail to the preferred embodiments of the present invention, examples of which are illustrated in the accompanying drawings.

First embodiment

Figure 1:
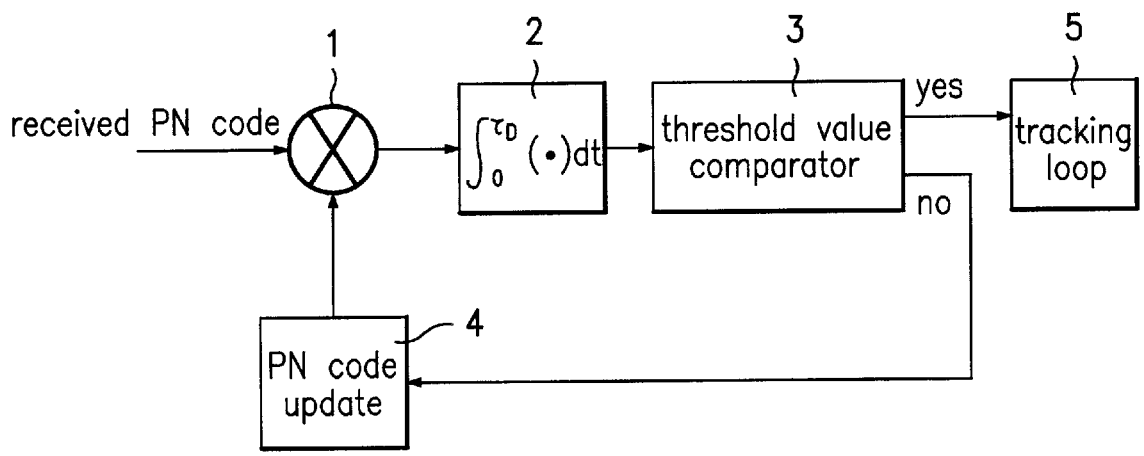
FIG. 1 is a conceptual block diagram of a circuit implementing a conventional binary code synchronization.
Figure 2:
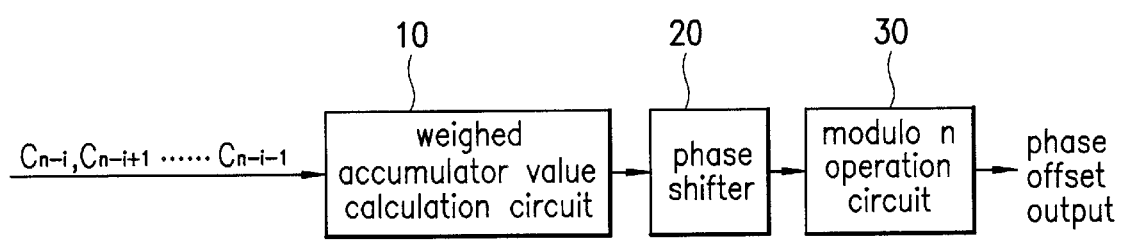
FIG. 2 is a block diagram for implementing a binary code phase offset calculation method according to a first embodiment of the present invention.
Figure 3:
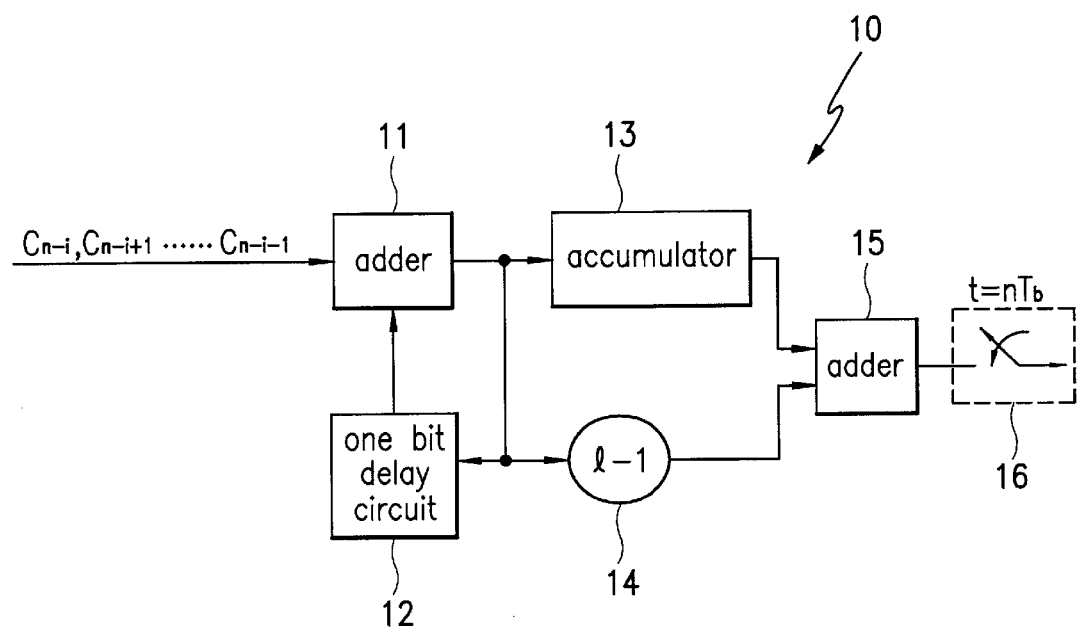
FIG. 3 is a detailed block diagram for the weighted accumulation value calculation method in FIG. 2.
Figure 4:
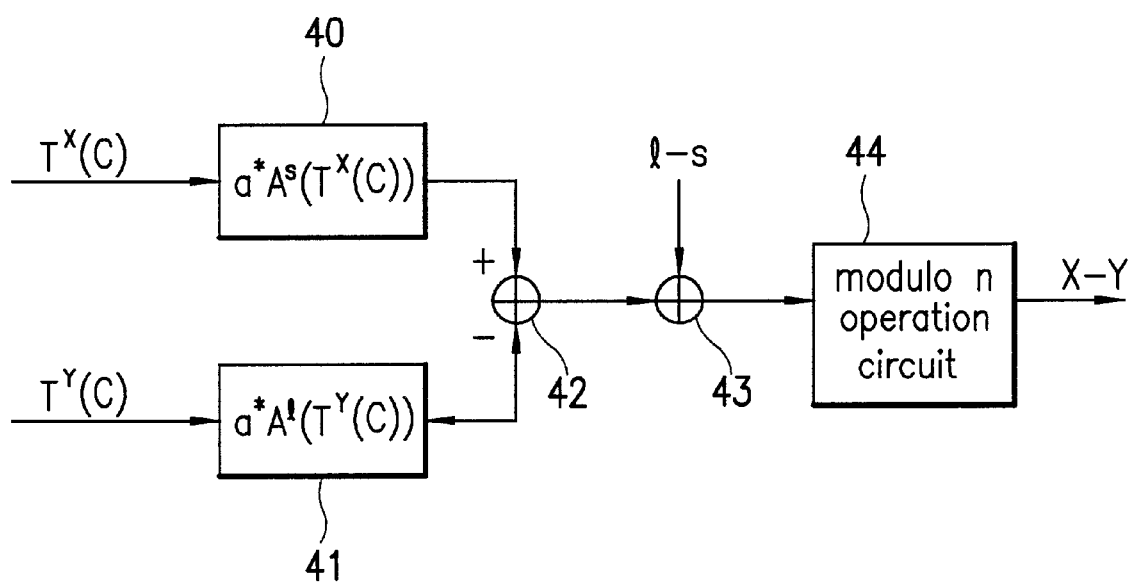
FIG. 4 is a diagram for a phase offset calculation method of binary code according to a third embodiment of the present invention.

The first embodiment according to the present invention also calculate the phase offset of the binary code C satisfying the following condition: that n and k are prime to each other when the elements satisfying gcd(n,k)=1, that is, the elements of the binary code, are 0 and 1, and a number of the element 0 included in the period n of the binary code is k. FIG. 2 is an exemplary embodiment which shows a block diagram of the binary code phase offset calculation circuit using an accumulator function with a weight value 1. FIG. 3 is a detailed block diagram showing the weighted accumulator value calculation circuit 10 of FIG. 2. FIG. 4 is a flow chart implementing the binary code phase offset calculation method according to the present invention.

Figure 5A:
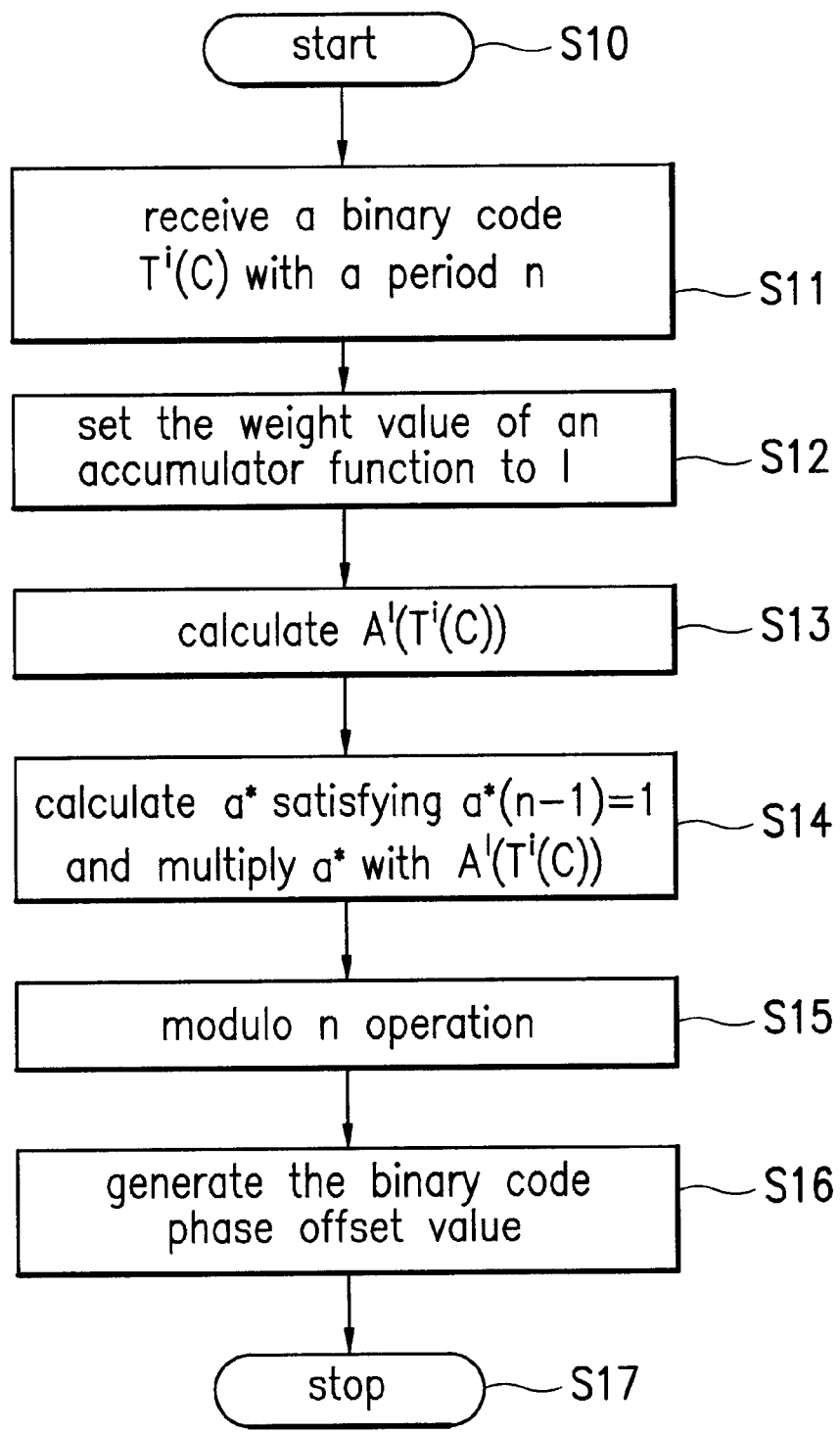
FIG. 5a is a flow chart for implementing the first embodiment of the present invention.

Referring to FIG. 5A, step S11, a binary code $T^i(C)$ having a period n and the elements of {0, −1} is received and in S12, a weight value 1 for the accumulator function is established.

In S13, a weighted accumulator value $A^l T^i(C)$ is calculated.

Said weighted accumulator value is calculated by the weighted accumulator value calculation circuit 10 of FIG. 2

First, at the time t=Tb, the first bit $C_{n-i-1}$ of the binary code $T^i(C)$ is received by the adder 11 and an addition is performed for the first bit. At this time, since there is no signal from the one bit delay circuit 12, the output of the adder 11 is $C_{n-i-1}$ itself. The output of the adder 11 is applied to both the accumulator 13 and the one bit delay circuit 12 so as to be delayed by one bit. The accumulator value of the accumulator 13 is $C_{n-i-1}$.

Then, at t=2Tb, a second bit $C_{n-i-2}$ of the binary code $T^i(C)$ is received by the adder 11 and is added to the first bit $C_{n-i-1}$ provided by the one bit delay circuit 12. The result of the addition of $C_{n-i-1}+C_{n-i-2}$ is applied to both the accumulator 13 and the one bit delay circuit 12 so as to be delayed by one bit.

In the same way, when the last bit $C_{n-i}$ of the binary code $T^i(C)$ is applied to the adder 11 at t=nTb, this last bit $C_{n-i}$ is added to the output $C_{n-i-1}+C_{n-i-2}+\ldots+C_{n-i+1}$ of the delay circuit 12. Therefore, the output of the adder 11 at t=nTb is $C_{n-i-1}+C_{n-i-2}+\ldots+C_{n-i+1}-C_{n-i}$. This output of the adder 11 is applied to both the accumulator 13 and the one bit delay circuit 12 so as to be delayed by one bit. The output of the accumulator 13 at this time is represented by equation 4. This output $C_{n-i-1}+C_{n-i-2}+\ldots+C_{n-i+1}+C_{n-i}$ of the adder 11 is also applied to the weight value calculation circuit 14. The output of the weight value calculation circuit 14 is (l−1) $(C_{n-i-1}+C_{n-i-2}+\ldots+C_{n-i+1}+C_{n-i})=(l-1)C(1)$.

At t=nTb, the output of the accumulator 13 and the output of the weight value calculation circuit 14 are simultaneously applied to the adder 15 whose output is $A^l T^i(C)$ represented by equation 6. The output of the adder 15 is outputted through the switching circuit 16.

In S14, the arithmetic inverse a* of a*(n−k)=1(mod n) is calculated by the phase shifter and the inverse is multiplied with the weighted accumulator $A^l T^i(C)$. The output of the phase shifter 20 is applied to the modulo n operation circuit 30 and converted into the binary code phase offset.

FIGS. 7a to 7f are the tables showing the weighted accumulator value $A_0^l(T^i(C))$ and the phase offset calculation value $a^* A_0^l(T^i(C))$ according to the binary code $T^i(C)$ when the period n is 7, the weight value l is 1 and a number k of the element 0 is from 1 to 6.

When n is 7 and k is 1, as shown in FIG. 7a, a* is obtained by applying n=7 and k=1 into a*(n−k)=1(mod n).

$a^*(7-1)=1(mod\ 7)$ $a^*6=1(mod\ 7)$ $a^*=6$

Therefore, the phase offset calculation value $a^* A_0^l(T^i(C))$ (mod n) is represented by $6 A_0^l(T^i(C))(mod\ 7)$. By calculating this value for each I, the table of FIG. 7a is obtained.

In the same way, the binary code phase offset calculation values for the cases of k=2 to 6 are shown in FIGS. 7b to 7f, respectively.

As shown in FIGS. 7a to 7f, the corresponding relationship between the value of i and the phase offset values are maintained for all cases.

Second Embodiment

The second exemplary embodiment according to the present invention is for the case that the elements of the binary code are −1 and 1. All the steps calculating the phase shift are the same as the first embodiment, except that the equation a*(n−2k)=1(mod n) for calculating the arithmetic inverse a* is used for the second embodiment.

Figure 5B:
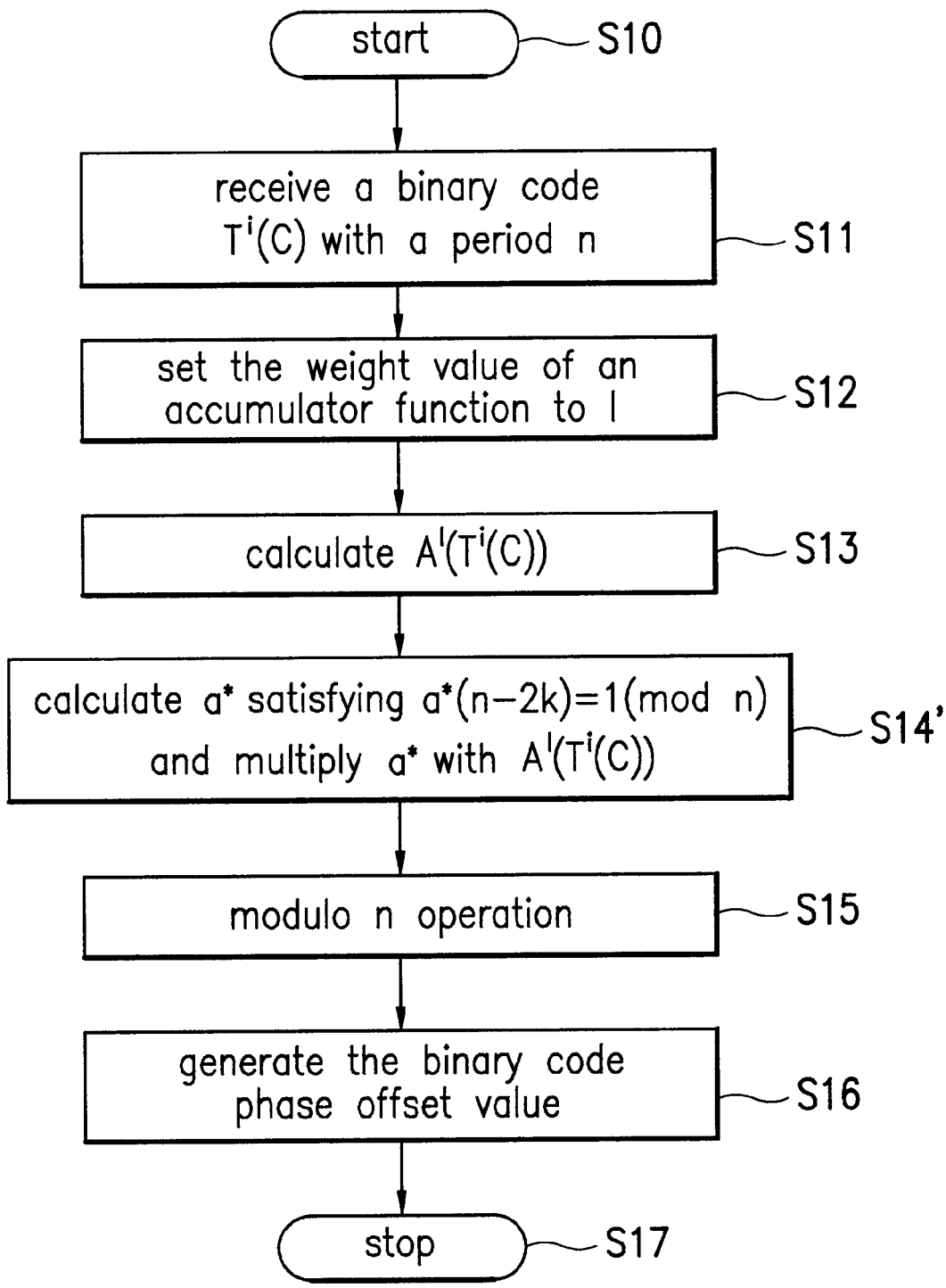
FIG. 5b is a flow chart for implementing a second embodiment of the present invention.

In other words, in the step S14 of FIG. 5a of the first embodiment, the inverse .a* is calculated according to the equation a*(n−k)=1(mod n) in order to calculate the phase shift value and this inverse a* is multiplied with the weighted accumulator value $A^l(T^i(C))$. However, as shown in FIG. 5b of the second embodiment, the step S14' is to calculate the inverse a* by the equation .a*(n−2k)=1(mod n). The other steps of FIG. 5b have the same numerals to designate the same functions as those of FIG. 5a, respectively.

In the second embodiment, the inverse .a* calculated from the equation .a*(n−2k)=1(mod n) in the step S14' is multiplied with the weighted accumulator value $A^l(T^v(C))$ calculated in the step S13, and the result value is converted into the binary code phase offset calculation value by the modulo n operation circuit 30 (S15, S16).

For example, in the case that n=7 and k=1, the inverse a* is calculated from the equation $.a*(n-2k)=1(\text{mod } n)$. By substituting n=7 and k=1 into the equation $.a*(n-2k)=1(\text{mod } n)$, the inverse a*=3 is obtained.

In the same way, the weighted accumulator values and the binary code phase offset calculation values converted from the weighted accumulator values by the modulo n operation when n=7, the weight value l=1 and k=1 to 6 are shown in FIGS. 8a to 8f, respectively.

Third Embodiment

Figure 6:
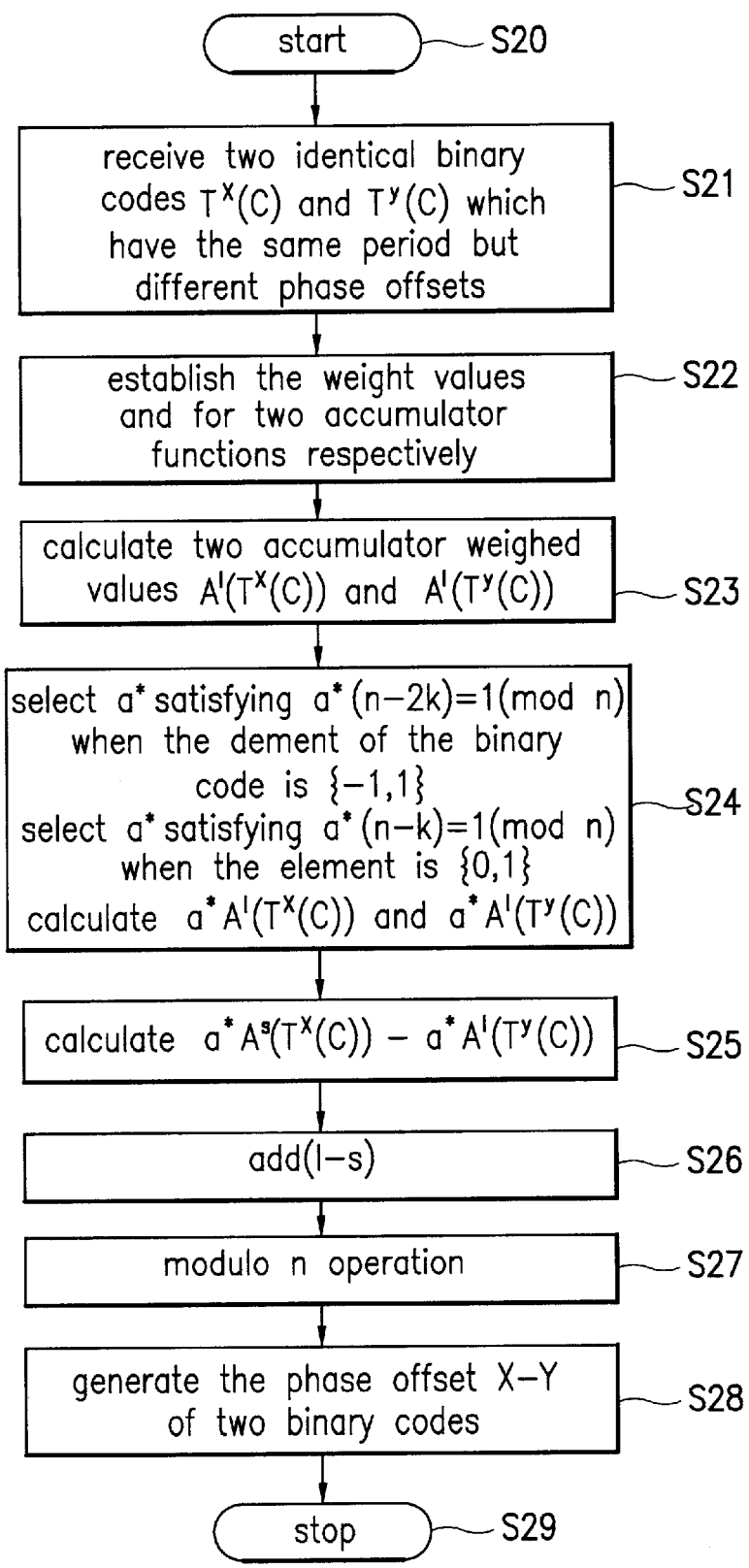
FIG. 6 is a flow chart for implementing the third embodiment of the present invention.

FIG. 4 is a block diagram implementing the third embodiment according to the present invention and FIG. 6 is the flow chart for the third embodiment.

The third embodiment is the calculation method for calculating the phase offset of the binary code which satisfies the condition that gcd(n, 2k)=1 when its element is {-1, 1} and the condition that gcd(n, k)=1 when its element is {0, 1}. In this case, by using the accumulator whose weight values are different from each other, the phase offset between the binary codes received through different paths is calculated. In the step S21, the two weight values s and l are established for the accumulator functions concerning with two identical binary codes $T^X(C)$ and $T^Y(C)$ having the same period but X and Y phase offsets, respectively.

In the step S23, the weighted accumulator functions $A^s(T^X(C))$ and $A^l(T^Y(C))$ are calculated according to the established weight values s and l.

In the step S24, a* that satisfies the equation $a*(n-2k)=1(\text{mod } n)$ is established when the element of the binary code is {-1, 1} and a* that satisfies the equation $a*(n-k)=1(\text{mod } n)$ is established when the element of the binary code is {0, 1}. After then, $a*A^s(T^X(C))$ and $a*A^l(T^Y(C))$ are obtained by multiplying the inverse a* with the accumulator values $A^s(T^X(C))$ and $A^l(T^Y(C))$, respectively.

Said steps S22 and S24 are performed by the phase shift weighted accumulator value calculation circuits 40 and 41 of FIG. 4.

The step S25 shows that the difference $a*A^s(T^X(C))-a*A^l(T^Y(C))$ is evaluated. It is performed by the adder 42 of FIG. 4.

The step S26 shows that the difference l-s of the two weight values is added to the output of the adder 42 of FIG. 4 by the adder 43.

The step S27 shows that a modulo n operation is performed by the modulo n operation circuit 44 whose output is the binary code phase offset X-Y.

Said binary code phase offset X-Y means that the code $T^X(C)$ is what is shifted from the code $T^Y(C)$ right by X-T bits.

In the third embodiment, when the period n=5, k=3, the element C∈(0, 0, 0, 1, 1, 1), X=3, Y=2, s=2 and l=3, the phase offset between two binary codes is obtained as follows.

Using said parameters, the equations for calculating the phase offset between the two binary codes are $$a*A^s(T^X(C))=a*A_0^2(T^3(C)),$$

$$a*A^l(T^Y(C))=a*A_0^3(T^2(C))$$

and $$l-s=1.$$

Since n=5 and k=3, gcd(n, k)=1.

The inverse for the a=-3 modulo 5 is a*=3 and therefore the table of FIG. 8 is obtained. The column of FIG. 9 shows the variations of the accumulator function values according to the cyclic shift in the binary code when the weight value is determined. The value of the column is the remainder according to the modulo 5.

Therefore, from the table of FIG. 9, $a*A_0^2(T^3(C))(\text{mod } 5)=1$ and $a*A_0^3(C)(\text{mod } 5)=4$.

Therefore, the output of the adder 42 of FIG. 3 is (1-4)=-3. The output of the adder 43 is -3+1=-2=3 modulo 5. This means that the binary code $T^3(C)$ is the binary code $T^0(C)=C$ that the cyclic shift to the right is performed by 3 bits in the elements. Furthermore, this value is exactly the same as the calculated phase offset value.

Fourth Embodiment

Figure 10:
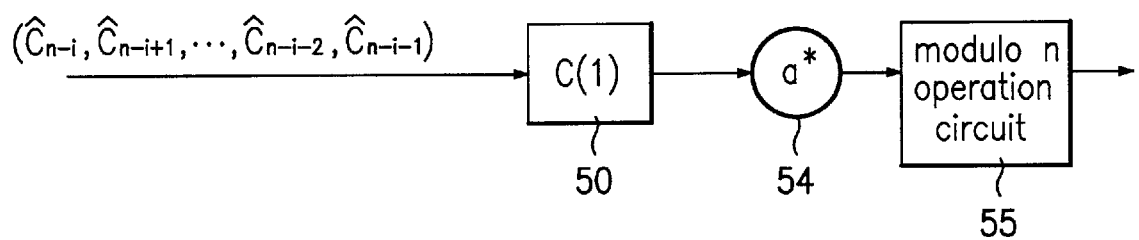
FIG. 10 is a schematic diagram of a circuit of a fourth embodiment of the present invention for providing a phase error detection method of binary code.

FIG. 10 is a schematic diagram showing the circuit for implementing the binary code error detection method by using a phase offset according to the fourth embodiment of the present invention. The circuit includes an added value operation circuit 50, a phase shifter 54 and a modulo n operation circuit 55.

Figure 11:
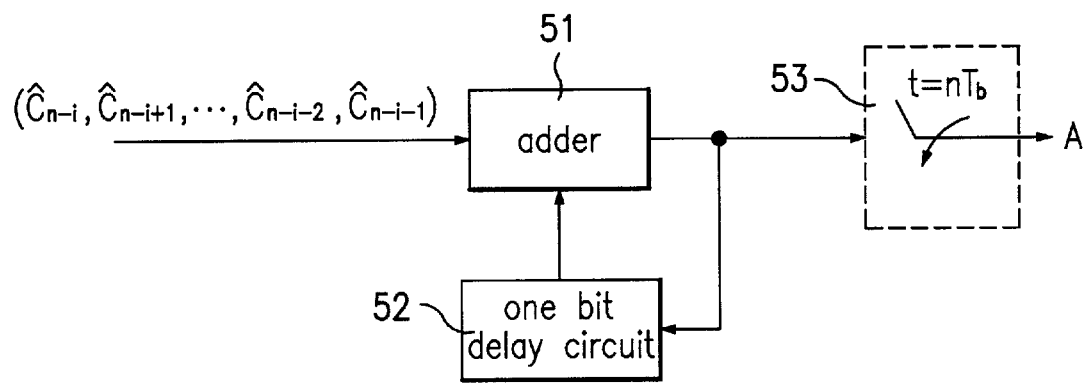
FIG. 11 is a block diagram for an addition value operation circuit according to the present invention.

FIG. 11 shows the added value operation circuit 50 in detail. The circuit 50 includes an adder 51 to add the present bit among the elements of the binary code and the bit delayed by one bit, an one bit delay circuit 52 for delaying the output of the adder 51, and a switching circuit 53 for outputting the added value that is the result value accumulated by the adder 51 during one period.

In the binary code error detection method according to the fourth embodiment of the present invention, the binary code accumulator value is calculated by adding each bit of the binary code $T^i(\hat{C})=(\hat{C}_{n-i}, \hat{C}_{n-i-1}, \ldots, \hat{C}_{n-i-1})$ being received at the present time and the added value which is the output of the adder 51 obtained just one bit interval ago and by performing the adding operation for one period which is the n bit interval.

For example, when one bit $\hat{C}_{n-i-1}$ of the binary code $T^i(\hat{C})$ is applied to the adder 51 of the added value operation circuit 50 at the time t=kTb (where Tb is the one bit time interval), the preset bit $\hat{C}_{n-i-1}$ is added to the result that all bits received by the adder 51 before receiving the bit $\hat{C}_{n-i-1}$ have been added. The output of the adder 51 at t=kTb is again delayed by the one bit delay circuit 52 and then added with the next coming bit $\hat{C}_{n-i-2}$. This procedure is repeated for one period from the first bit to the last nth bit and the binary code accumulator value $\hat{C}(1)$ is calculated. At the time t=kTb, the switching circuit 53 outputs the added value of the adder 51 as the accumulator value $A(=\hat{C}(1))$.

A phase shift is performed on the accumulator value $\hat{C}(1)$ by the phase shifter 54

In other words, when the binary code consists of the element (0, 1), the inverse a* calculated by the equation $a*(n-k)=1(\text{mod } n)$ is multiplied with the accumulator value obtained from the switching circuit 53 by the phase shifter 54 so that the phase shift value $a*\hat{C}(1)$ is obtained. When the binary code consists of the element (-1, 1), the inverse a* calculated by the equation $a*(n-2k)=1(\text{mod } n)$ is multiplied with the accumulator value obtained from the switching circuit 53 by the phase shifter 54 so that the phase shift value $a*\hat{C}(1)$ is obtained.

The phase shift value $a*\hat{C}(1)$ is converted into the binary code phase offset $a*\hat{C}(1)(\text{mod } n)$ by the modulo n operation circuit 55. It is determined whether or not the phase offset $a*\hat{C}(1)(\text{mod } n)$ is 1.

As explained in the definition of the terminologies, in the case that a number of the elements (0 or -1) k̂ when errors have already occurred in the received binary code $T_i(\hat{C})$ equals k that is a number of the elements of the correct binary code without including any error, the phase offset $a*\hat{C}(1)(\text{mod } n)$ does not equal 1.

Therefore, if the phase offset a*Ĉ(1)(mod n) is not 1, it means that there is some error in the received binary code. On the contrary, if the phase offset a*Ĉ(1)(mod n) is 1, it is determined that the received binary code is correct.

However, the case that there is error in the received binary code $T^i(\hat{C})$ and k̂=k is eliminated from the scope of the present invention because it is not detected by the error detection method according to the present invention.

On the contrary, the probability Pe that k̂=k and the received binary code includes error is calculated by equation 9.

$$P_e = \sum_{i=0}^{\min(n-k,k)} \binom{n-k}{i}\binom{k}{i} P^{n-2i}(1-p)^{2i}, \quad \text{[equation 9]}$$

where $P$ is a Symbol Correctness

Probability for a digit Estimate and equation 9 is reduced to equation 10 since k=(n−1)/2 for the case of PN code.

$$P_e = \sum_{i=0}^{(n-1)/2} \binom{(n+1)/2}{i}\binom{(n-1)2}{i} P^{n-2i}(1-p)^{2i} \quad \text{[equation 10]}$$

For the case of BPSK, $$p = \tfrac{1}{2}\{1 + \mathrm{erf}(\sqrt{E_b/N_0})\}$$

Figure 15:
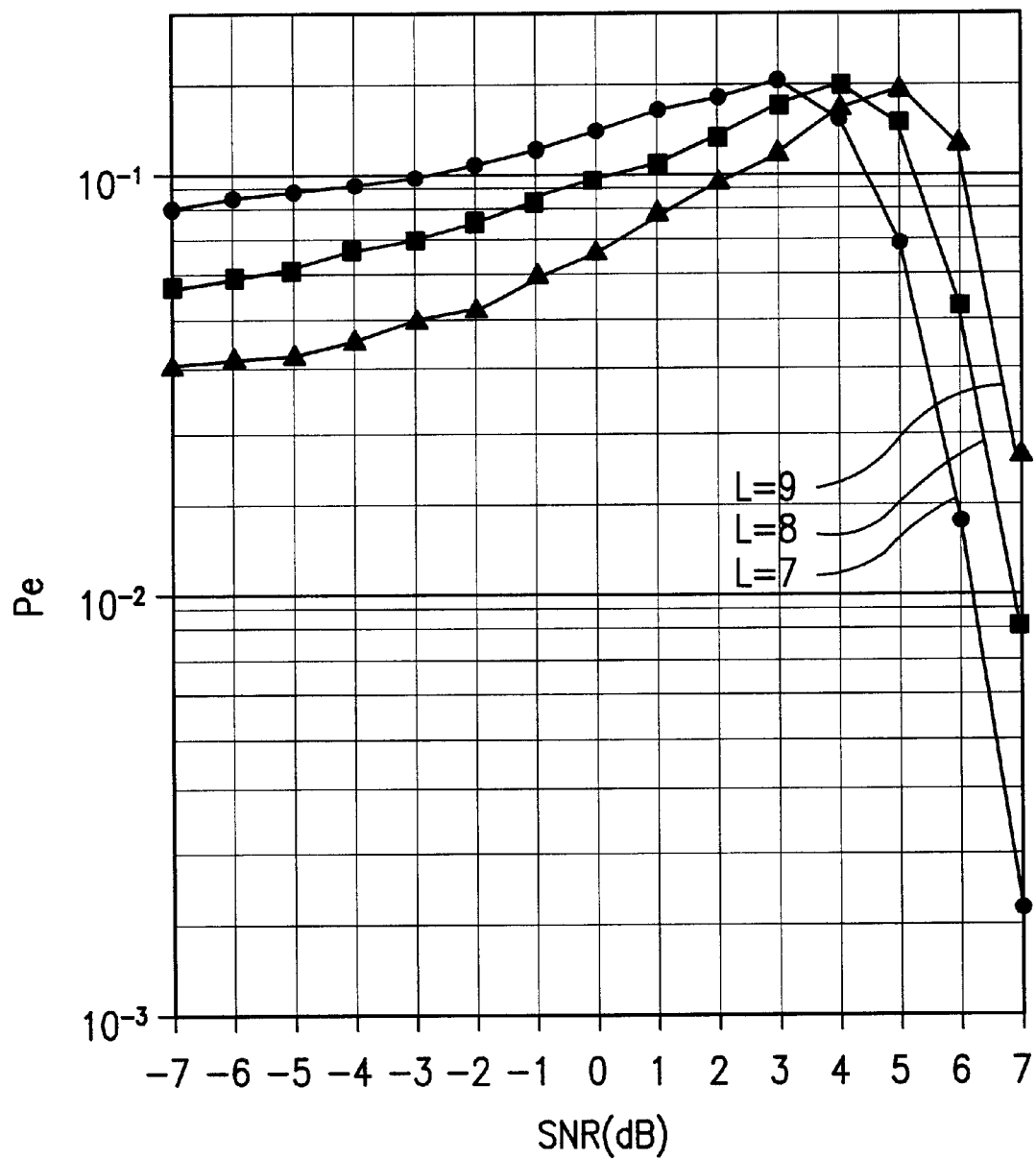
FIG. 15 is a graph showing a error probability (Pe) according to a signal to noise ratio (S/N) in the phase error detection method of binary code of the present invention.

FIG. 15 shows the probability Pe that BPSK includes error when the length of the received ON code is n=$2^L$−1 and L=7, 8 and 9. As shown in FIG. 15, the reason that Pe decreases when SNR decreases is that the probability for k̂ which belongs to the neighborhood of the code having error to equal k decreases. The probability that there is no error in the binary code received for one period is $P^n$. The probability for at least one error to be included in the binary code is 1−$P^n$. Where a parameter t is defined as a number that a whole period of the binary code is completely received the probability for the binary code having no error to be received at the t-th is $$P(t) = P^n(1-P^n)^{t-1} \quad \text{[equation 11]}$$

The average t is $$\bar{t} = \sum_{t=1}^{\infty} t \cdot P(t) \quad \text{[equation 12]}$$
$$= \sum_{t=1}^{\infty} t \cdot p^n \cdot (1 - p^n)^{t-1}$$
$$= \frac{1}{p^n}$$

Fifth Embodiment

Figure 12:
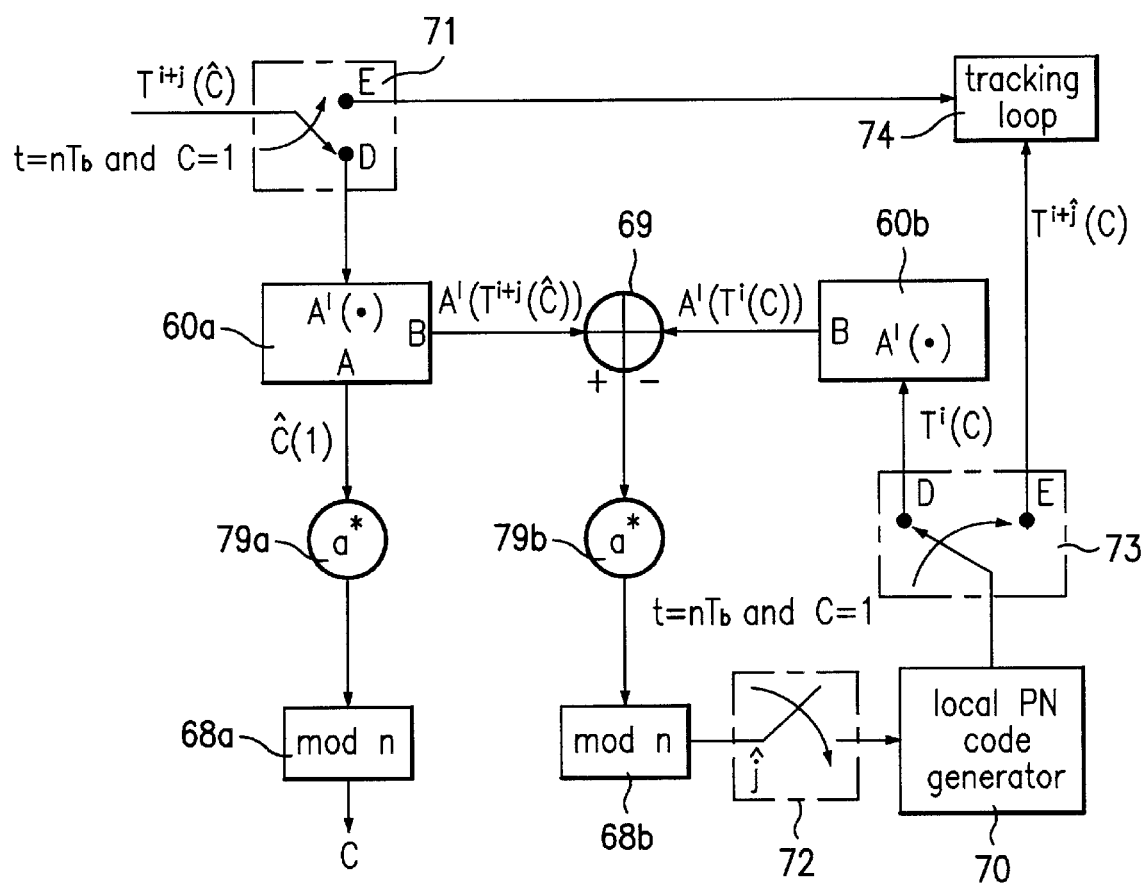
FIG. 12 is a schematic diagram of a synchronization method of binary code according to a fifth embodiment of the present invention.

FIG. 12 shows the circuit for the fifth embodiment according to the present invention. The circuit is the binary code phase synchronization circuit to implement the binary code phase synchronization method using the binary code phase offset and the binary code phase error detection.

Said binary code phase synchronization circuit includes an accumulator value calculation circuit 60a which receives the binary code $T^{i+j}(\hat{C})$, calculates the added valued (1) and the accumulator value $A^l(T^{i+j}(\hat{C}))$, respectively, a phase shifter 79a which performs a phase shift on said added value Ĉ(1), the modulo n operation circuit 68a which performs the modulo n operation on said phase shifted added value a*Ĉ(1) and generates the operation value C, the local PN code generator 70 which is included in the receiver and generates the local PN code $T^i(C)$, the adder 69 which accumulates the local PN code $T^i(C)$ of the local PN code generator 70 for one period and generates the accumulator value $A^l(T^i(C))$ and then the accumulator value $A^l(T^{i+j}(\hat{C}))$, the phase shifter 79b which performs the phase shift on the difference $A^l(T^{i+j}(\hat{C})) - A^l(T^i(\hat{C}))$, and the modulo n operation circuit 68b which performs the modulo n operation on the output $a*(A^l(T^{i+j}(\hat{C}))) - A^l(T^i(\hat{C}))$ of the phase shifter.

The numerals 71, 72 and 73 which are not explained above are the switching means, the numeral 74 is a tracking loop for the fine synchronization of the received binary code.

Said accumulator value operation circuit 60a, the phase shifter 79a and the modulo n operation circuit 68a are the circuits for performing the binary code error detection that determines whether or not a number of the received binary code errors, that is, a number of 0 and 1, k̂ equals k of the correct binary code.

The characters A and B in FIG. 12 represent the outputs A and B of the accumulator value calculation circuits 60a and 60b, respectively.

Said accumulator value calculation circuits 60a and 60b, the adder 69, the phase shifter 79b, the modulo n operation circuit 68b, the local PN code generator 70 and the switching circuits 72 and 73 are the circuits for the synchronization acquisition, that is, the coarse synchronization, and the accumulator value calculation circuit 60a is commonly used.

The switching circuits 71 and 73 is connected to D when the first synchronization starts and connected to E when the accumulation operation is performed for the time t=nTb and the output C of the modulo n operation circuit 68a which does not include any error is 1.

Figure 13:
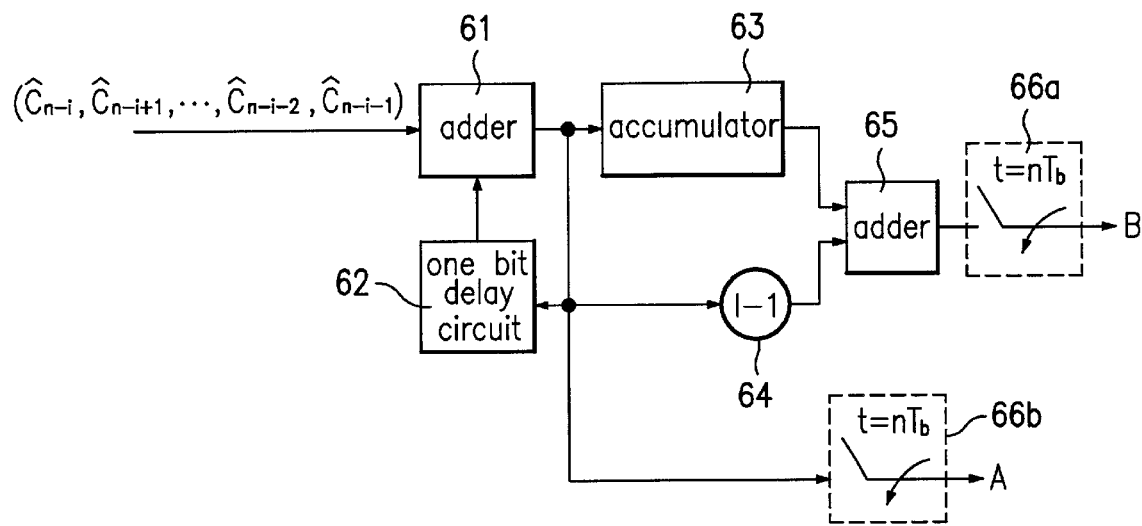
FIG. 13 shows a block diagram for an accumulation value operation circuit according to the present invention.

FIG. 13 shows the accumulator value calculation circuits 60a and 60b in detail which includes the adder 61 which continuously adds bits of binary code, the one bit delay circuit 62 which delays the output of said adder 61 by one bit interval, the accumulator 63 which accumulates the output of said adder 61, the weight value calculation circuit 64 which multiplies the output of said adder 61 with the weight value (1−1), the adder 65 which adds the output of said accumulator 63 and the output of said weight value calculation circuit 64, and the switching circuit 66a which outputs the output of said adder 65 every one period(t=nTb).

The binary code synchronization method which uses said binary code phase synchronization circuit is explained as follows.

Figure 14:
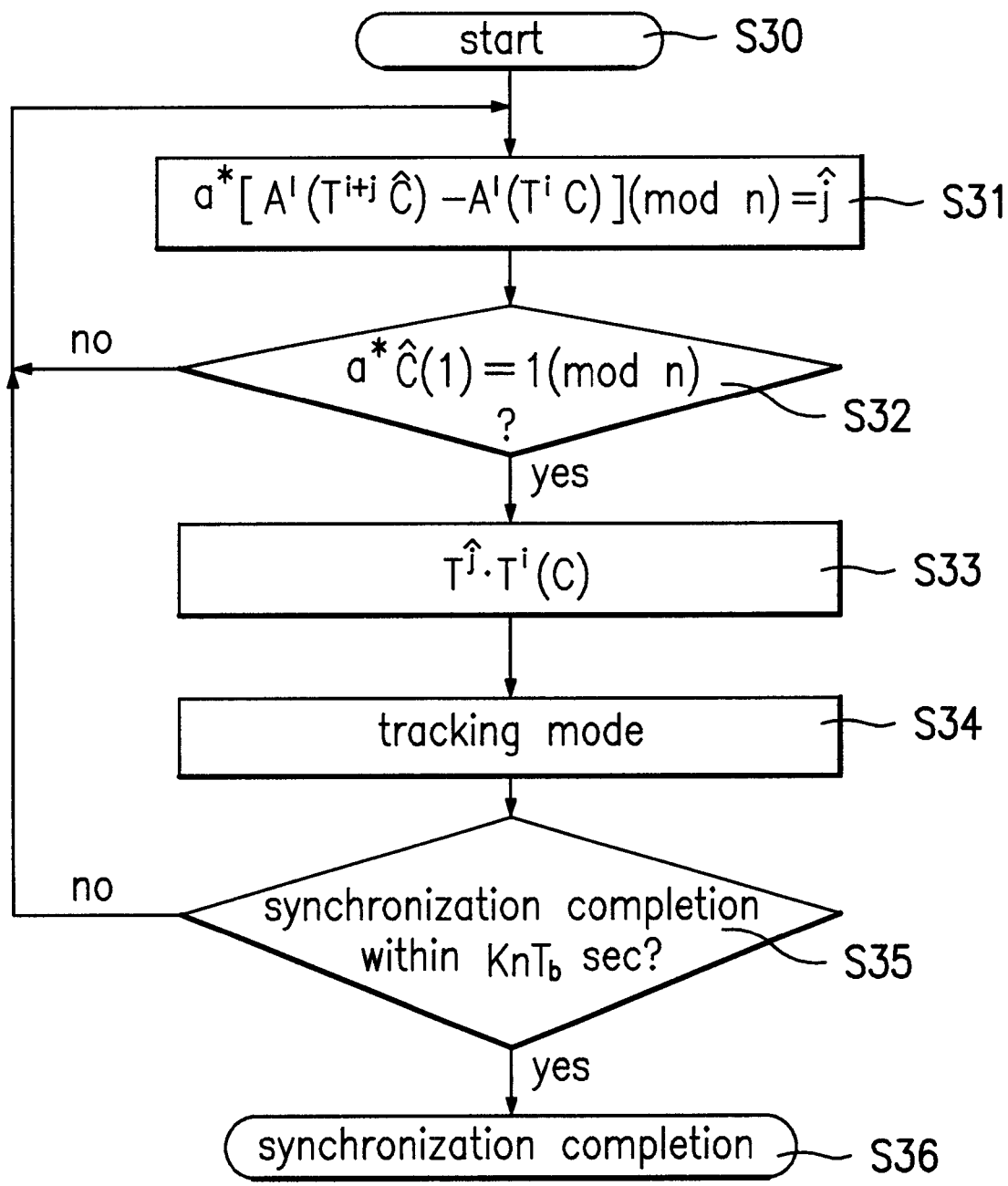
FIG. 14 is a flow chart for implementing a synchronization method of binary code according to the present invention.

FIG. 14 is a flow chart for implementing the phase synchronization method according to the present invention.

In the step S31, the accumulator value calculation circuit 60a calculates the accumulator value $A^l(T^{i+j}(\hat{C}))$ for one period of the received binary code $T^{i+j}(\hat{C})$, the accumulator value calculation circuit 60b calculates the accumulator value $A^l(T^i(C))$ for one period of the binary code $T^i(\hat{C})$ generated from the local PN code generator 70, and then the adder 69 calculates the difference $A^l(T^{i+j}(\hat{C})) - A^l(T^{i+j}(C))$. Furthermore, the phase shifter 79b calculates the phase shift value and generates the phase offset ĵ by performing a modulo n operation on the output of the phase shifter. The accumulator value $A^l(T^{i+j}(\hat{C})$ for one period is calculated by the accumulator value calculation circuit of FIG. 13. For example, when a binary code $\hat{C}_{n-j-1}$ is applied to the adder 61, there is no bit in the one bit delay circuit 62. Therefore, the first bit of the binary code $\hat{C}_{n-j-1}$ appears at the output port of the adder 61. This output is applied to both the accumulator 63 and the one bit delay circuit 62.

When the second bit of the binary code $\hat{C}_{n-j-1}$ is applied to the adder 61, the second bit is added with the first bit which is applied from the one bit delay circuit 62 and the result appears at the output port of the adder 61.

This procedure is repeated n times which is the same as the period of the binary code.

The accumulator 63 accumulates the output of the adder 61 every time that each bit of the binary code is received by the adder 61. The weighted value calculation circuit 64 multiplies the weight value (l−1) with the last bit output calculation value $\hat{C}(1)$ obtained from the adder 61. The adder 65 adds the output $(l-1)(\hat{C}(1))$ of the weighted value calculation circuit 64 and the output $A(T^{i+j}(\hat{C}(1)))$ of the accumulator 63.

By using the accumulator value calculation circuit of FIG. 13, the last bit output calculation value of the adder 61 is converted into $AC=\hat{C}(1)$ by the switching circuit 66b and then the phase shift of the output $AC=\hat{C}(1)$ is performed. After then, by a modulo n operation, $a*\hat{C}(1)(\text{mod } n)$ is obtained. It is determined whether or not $a*\hat{C}(1)(\text{mod } n)=1$. If $a*\hat{C}(1)(\text{mod } n$ does not equal 1, it indicates the case that there is some error in the received binary code. Therefore, the procedure returns to the step S31 and repeats the steps S31 and S32 until $$a*\hat{C}(1)(\text{mod } n)=1.$$

If $a*\hat{C}(1)(\text{mod } n)=1$ in the step S31, it is assumed that there is no error in the received binary code and then the procedure goes through to the step S33. In this step, the local PN code $T^i(C)$ is generated from the local PN code generator 70 in advance by the phase offset ĵ calculated in the step S31. By making the output of the PN code generator 70 satisfy the condition that $T^{\hat{j}}T^i(C)=T^{i+j}(C)$ so that the phase offset of the local PN code generator coincides with the phase offset of the received binary code, the synchronization acquisition is completed.

In the step S34, by connecting E of the switching circuits 71 and 73, the tracking loop 74 receives the received binary code $T^{i+j}(\hat{C})$ and the binary code from the local PN code generator and performs a tracking mode for the fine synchronization mode. If the fine synchronization is not completed within KnTb (where K is a penalty for a false alarm), the procedure returns to the starting step S31 and repeats the steps until the fine synchronization is completed within KnTb.

In other words, in the tracking mode, the timing error for the received code and the code stored in the receiver has already been set to zero. However, if the exact synchronization is not achieved within the predetermined time KnTb, the calculated phase offset information is wrong. This means that there is some error in the binary code even though k=k̂. Therefore, the procedure returns to the first step S31.

This false alarm probability is equal to Pe.

If Te represents the time to determine whether or not error is included in the received code sequence, the average Te is calculated by equation 13.

$$\overline{T_e}=P_e KnTb \qquad \text{[equation 13]}$$

Therefore, the average initial synchronization time is calculated by equation 14.

$$\overline{T_a}=\overline{i}\cdot(nTb+\overline{T_e})=\overline{i}\cdot nTb(1+KP_e) \qquad \text{[equation 14]}$$

In order to show how much the average initial synchronization time of the present invention is improved when compared with the conventional method, an improvement factor is defined by the ratio of the average initial synchronization time of the present invention to the that of a conventional series synchronization method under the condition that the two cases have the same period and high SNR.

Since $P_0 \approx 1$ and $P_{FA} \approx 0$ when the SNR is very high, the average initial synchronization time for the case of q=n is $0.5n^2 Tb$.

Therefore, the improvement factor is given by $n/(2E(1+KPe))$.

If the improvement factor is 1, there is no improvement in the system according to the present invention. If the improvement factor is greater than 1, the average synchronization acquisition time (initial synchronization time) of the present invention is reduced by the factor. If the improvement factor is less than 1, the average synchronization acquisition time (initial synchronization time) of the present invention is expanded by the inverse of the factor.

Figure 16:
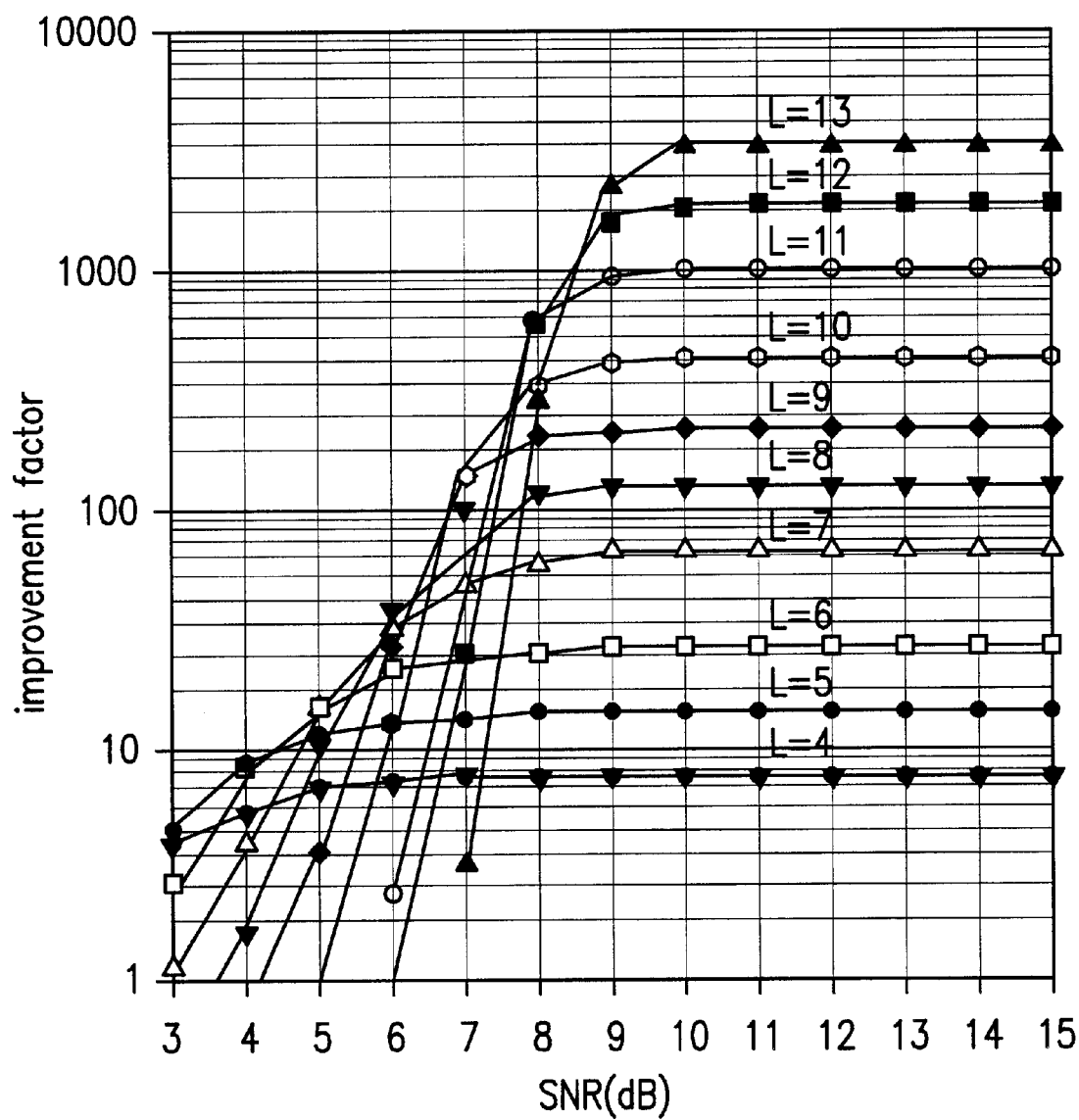
FIG. 16 is a graph showing an improvement ratio of the phase synchronization method of binary code of the present invention to a conventional method.

FIG. 16 shows the improvement factor when the length of the PN code n is $2^L - 1$, L=4 to 13 and k=10. As shown in FIG. 16, the method according to the present invention has a great improvement factor in the high SNR region. For example, since the improvement factor is 4000 at SNR=10 dB, the method of the present invention achieves the synchronization acquisition faster than a conventional method by 4000 times.

Therefore, if the method of the present invention is used in a comparatively good channel, a pretty fast synchronization acquisition is achieved.

Thus, when the phase offset calculation method of the present invention is applied to the CDMA mobile communication system, since the terminal (or mobile station) of each subscriber is able to directly calculate the phase offset without help of its base station and match the phase offset, the subscriber can directly perform a soft hand off and therefore the traffic of the base station can greatly be reduced. Furthermore, one subscriber is able to get the phase offset information which is used by other subscribers and therefore a subscriber can determine the phase offset or the channel which is not used by other subscribers. This means that the traffic of the base station is also reduced and the binary code error detection is able to be achieved by the effectively simple method.

It will be apparent to those skilled in the art that various modifications and variations can be made in the reduction method of successive hard handoffs between base stations in the CDMA mobile communication system of the present invention without departing from the spirit or scope of the invention. Thus, it is intended that the present invention covers the modifications and variations of this invention provided they come within the scope of the appended claims and their equivalents.

What is claimed is:

1. A phase offset calculation method of a binary code, comprising the steps of:

receiving a cyclic binary code $T^i(C)$ having a period of n;

setting a weight value l of the binary code and calculating a weighted accumulator value of the binary code by using the weight value l;

shifting a phase of the weighted accumulator value; and calculating a phase offset of said binary code by performing a modulo n operation on the phase-shifted weighted accumulator value.

2. The phase offset calculation method of the binary code claimed in claim 1, including that said binary code $T^i(C)$ satisfies that $T^i(C)=T^j(C)$, that is, $(C_{n-i}, C_{n-i+1}, ---, C_{n-i-2}, C_{n-i-1})=(C_{n-j}, C_{n-j+1}, ---, C_{n-j-2}, C_{n-j-1})$, when i=j(mod n) and $T^j(C)$ is represented by a polynomial $C(x)=C_{n-j}+C_{n-j+1}x + \ldots + C_{n-j-x}^{n-1}$ where i and j are integers.

3. The phase offset calculation method of the binary code claimed in claim 1, wherein the step of calculating the weighted accumulator value of the binary code includes the steps of:

performing a procedure that delays a (k−1)th bit of the binary code by 1 bit, adds the delayed bit to the kth bit in the binary code received at t=kTb, and accumulates each added bit repeatedly for k=1, 2, 3, . . . n to obtain an accumulated sum, where n is the period of the binary code;

calculating a weighted result value by multiplying l−1 (l is a weight value) with the last added bit at the t=nTb; and adding the weighted result value to the accumulated sum.

4. The phase offset calculation method of the binary code claimed in claim 1, wherein the step of shifting includes the steps of calculating an arithmetic inverse a* of n−k according to modulo n of a*(n−k)=1(mod n) when an element of said binary code $T^i(C)$ is {0,1} and then multiplying said inverse a* with said weight accumulator value.

5. The phase offset calculation method of the binary code claimed in claim 1, wherein the step of shifting includes the steps of calculating an arithmetic inverse a* of n−2k according to modulo n of a*(n−2k)=1(mod n) when an element of said binary code $T^i(C)$ is {−1,1} and then multiplying said inverse a* with said weight accumulator value.

6. A phase offset calculation method of a binary code comprising:

receiving a cyclic binary code having a predetermined period;

setting a weight value of an accumulator function based on the received binary code;

generating a weighted accumulator value using the received binary code and the set weight value;

multiplying the weighted accumulator value with an arithmetic inverse value to obtain a multiplied result; and generating a binary code phase offset value based on the multiplied result.

* * * * *